(No Model.)
D. P. SHARP.
TWO WHEELED VEHICLE.
No. 280,962. Patented July 10, 1883.
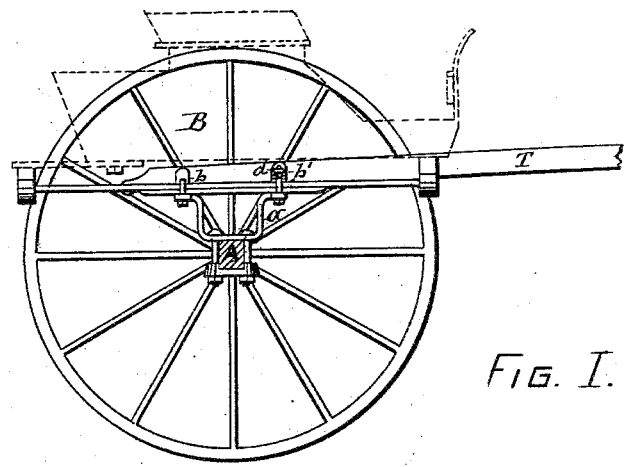
Fig. I.
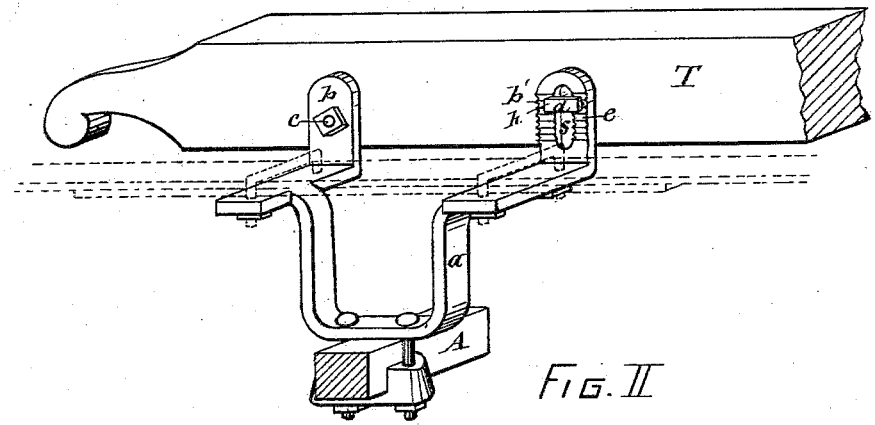
Fig. II
WITNESSES
C. Bendixon
Wm. C. Raymond
INVENTOR
Dennis P. Sharp
per Duell, Laass & Hey
his attys

UNITED STATES PATENT OFFICE.

DENNIS P. SHARP, OF ITHACA, NEW YORK.

TWO-WHEELED VEHICLE.

SPECIFICATION forming part of Letters Patent No. 280,962, dated July 10, 1883.

Application filed May 14, 1883. (No model.)

*To all whom it may concern:*

Be it known that I, DENNIS P. SHARP, of Ithaca, in the county of Tompkins, in the State of New York, have invented new and useful Improvements in Adjustable Thills for Vehicles, of which the following, taken in connection with the accompanying drawings, is a full, clear, and exact description.

This invention consists in improved devices for adjusting the thill of a vehicle so as to accommodate it to the height of the horse hitched thereto, said devices being more particularly designed for two-wheeled vehicles, in which the body is sustained in a horizontal position by the horse supporting the free end of the thills, and therefore said position is varied according to the variations in the height of the different horses hitched thereto.

In the annexed drawings, Figure 1 is a longitudinal section of a sulky or, so-called, "road-cart" provided with my improvement; and Fig. 2 is an enlarged perspective detail view, illustrating more fully the adjustable attachment of the thills.

Similar letters of reference indicate corresponding parts.

B denotes the body of the vehicle, which in this case is represented as being supported on a set of springs mounted on a bracket, $a$, usually termed a "jack," which is clamped onto the axle A. The side of said jack is provided with two vertical bearings, $b$ $b'$, to the outer side of which the thill T is attached, said attachment consisting of a bolt, $c$, passing horizontally through the thill and through an eye in one of the aforesaid bearings, and forming a pivot on which the thill is allowed to oscillate vertically. The other bearing, $b'$, is provided with a vertical slot, $s$, through which and through the thill passes a clamping-bolt, $d$, which is provided at one end with a head, $h$, having a serrated shoulder, by which it engages with serrations $e$ on the adjacent face of the bearing $b'$, the opposite end of the bolt being provided with a nut bearing on the outer side of the thill and crowding the thill against the bearing $b'$. By loosening the nut sufficiently to allow the head of the bolt $d$ to become liberated from the serrated face of the bearing $b'$ the free end of the thill can be raised or lowered, as may be desired, and then clamped in its position by tightening the nut $n$.

It will be observed that by the aforesaid devices I am enabled to adjust the thill according to the height of the horse to be hitched to it, and thus invariably sustain the body of the vehicle in a horizontal position, and this I accomplish in a most convenient, safe, and effective manner.

Having described my invention, what I claim as new, and desire to secure by Letters Patent, is—

The combination of the bracket $a$, having vertical bearings $b$ $b'$, provided, respectively, with an eye and a vertical slot, $s$, and with serrations $e$ on the bearing $b'$, and the thill T, applied to the outer side of said bearings and secured by bolts $c$ $d$, passing horizontally through said parts, substantially as described and shown.

In testimony whereof I have hereunto signed my name and affixed my seal, in the presence of two attesting witnesses, at Ithaca, in the county of Tompkins, in the State of New York, this 10th day of May, 1883.

DENNIS P. SHARP. [L. S.]

Witnesses:
B. R. WILLIAMS,
H. A. PARTONKINSON.